March 5, 1935.  F. B. BELL  1,993,430
WHEEL
Filed July 30, 1932
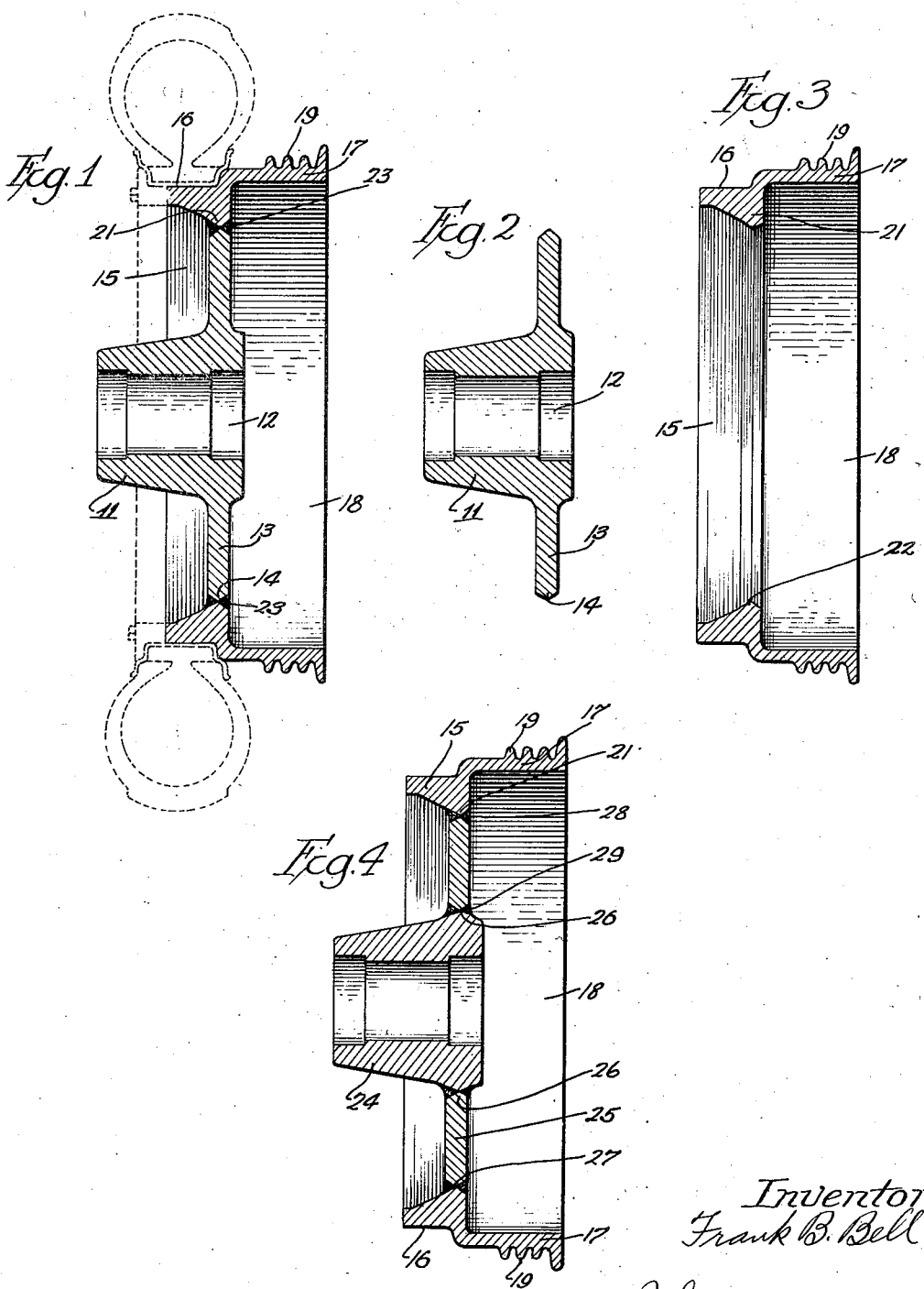

Patented Mar. 5, 1935

1,993,430

UNITED STATES PATENT OFFICE 1,993,430

WHEEL

Frank B. Bell, Pittsburgh, Pa., assignor to Edgewater Steel Company, Pittsburgh, Pa., a corporation of Pennsylvania Application July 30, 1932, Serial No. 626,483

2 Claims. (Cl. 301—6)

This invention relates to automobile wheels and the like and to their manufacture. It has for its object, broadly, the provision of a wheel, for use on an automobile, of simplified construction and of increased strength, and capable of being manufactured economically. It contemplates particularly the production of an automobile wheel which will consist of a single unitary integral part of great strength and rigidity, and the construction and formation of the material to provide a brake drum integral with the wheel itself and with the tire supporting part of the wheel.

An important object of the invention is the provision of an automobile wheel economically, constructed entirely of forged or rolled metal, preferably of steel. In accordance with the invention the hub and the rim ring are separately formed and thereafter welded together into a single integral whole. The parts may initially be forged or the metal worked into two or three separate members, one of which (where the structure is initially of two parts) consists of the hub and the plate or other connecting member extending out to the rim and, as a second part, the rim itself which conveniently may consist of the tire receiving seat and the brake drum.

Where the structure is initially provided in three parts, these parts consist (in accordance with the invention) of a central forged hub, a connecting plate or annulus, and the outer peripheral ring. Thus constructed the connecting annulus or plate is welded about its inner face to the outer face of the hub and about its outer face to an inwardly extending part or presented surface of the rim.

Numerous other objects and advantages of the invention will be apparent as it is better understood from the following description, which, when taken in connection with the accompanying drawing discloses a preferred embodiment thereof.

Referring to the drawing,

Figure 1 is an axial vertical section through an integral wheel constructed by welding two initially provided parts together;

Fig. 2 is a section through the hub and plate portion of Fig. 1;

Fig. 3 is a section through the rim portion of Fig. 1; and

Fig. 4 is a view similar to Fig. 1 showing the construction of an integral wheel from three pieces.

Considering first the embodiment of the invention shown in Figs. 1 to 3, reference character 11 indicates a central forged hub portion having the axial receiving central opening 12 of usual or desired configuration. A plate member or annulus 13 is formed integral with the hub 11 in its forging and extends out circumferentially for securement to the rim part. At its outer edge the plate part 13 is or may be beveled, as shown at 14, to facilitate the welding.

Reference character 15 indicates the peripheral rim part of the wheel, which is formed to provide a tire receiving seat 16 and a brake drum portion 17 having an integral brake engaging surface 18 and outwardly extending projections 19 for dissipating the heat of braking.

The part 15 is preferably provided with an inwardly extending flange 21 of inner diameter equal substantially to the external diameter of the plate part or connecting portion 13 already described. The inner extremity of the flange 21 is or may be beveled, as indicated at 22, to facilitate the welding. The rim part is preferably of wrought steel and may be rolled circumferentially into desired form from desired stock or it may be otherwise formed.

The parts, each of wrought metal, are then arranged with the hub portion in the relation to the rim portion illustrated in Fig. 1, and the outer edge of the plate member 13 is welded circumferentially at 23 to the inwardly extending flange 21 of the outer rim or ring member 15.

Referring to Fig. 4, the outer member 15 is formed as already described. The hub member, indicated at 24 in Fig. 4, is forged separately from the plate member, indicated at 25, which in this embodiment of the invention is a separate flat annulus. The annulus 25 is provided with an inner beveled edge 26 and an outer beveled edge 27. The dimensioning of the parts is such that they fit closely together for welding, as will be readily understood from an examination of the drawing. Thus constructed the outer edge of the annulus 25 is welded at 28 to the inwardly extending flange part 21 of the outer ring member. The inner edge 26 of the annulus is welded at 29 to the presented face part of the hub 24.

The welds 23, 27 and 29 are illustrated as of the arc or oxy-acetylene type and are formed by supplying supplemental metal which is fused along with the presented metal of the parts to form the weld.

It will be further understood that while the invention has hereinabove been described as embodied in an automobile wheel, it is capable of embodiment in hub and rim constructions for other purposes.

It is thought that the invention and many of its attendant advantages will be understood from the foregoing description, and it will be apparent that various changes may be made in the form, construction and arrangement of the devices mentioned herein and in the steps and their order of accomplishment of the process described herein, without departing from the spirit and scope of the invention or sacrificing all of its material advantages, the forms and processes hereinbefore described being merely preferred embodiments thereof.

I claim:

1. A rolled annulus for a wheel for automobiles and the like, comprising a cylindrical rim receiving seat portion and a brake drum portion formed integrally therewith and provided with circumferentially arranged heat radiating flanges, said brake drum portion being disposed at one side of said rim seat portion and wholly without the circumferential area thereof, and the external diameter of said rim seat portion being equal to the internal diameter of said brake drum portion, whereby the transfer of heat from said brake drum portion to said seat portion is minimized, and clearance is provided for said flanges.

2. In a wheel for automobiles and the like, a wrought steel peripheral rim part comprising a cylindrical rim receiving seat and a brake drum integral therewith and disposed at one side and wholly without the circumferential area thereof, the external diameter of said rim receiving seat being equal to the internal diameter of said brake drum, thus providing a shoulder for limiting the movement of a tire rim inwardly on said seat, and a flange extending radially inwardly from the junction of said seat and brake drum to facilitate welding of the rim part to another part of the wheel.

FRANK B. BELL.